(12) United States Patent
Boku et al.

(10) Patent No.: US 7,936,644 B2
(45) Date of Patent: May 3, 2011

(54) OPTICAL PICKUP DEVICE AND INFORMATION PROCESSING APPARATUS INCORPORATING THE OPTICAL PICKUP

(75) Inventors: Kouretsu Boku, Kyoto (JP); Kanji Wakabayashi, Kyoto (JP); Yoshiaki Komma, Osaka (JP); Hideki Hayashi, Nara (JP)

(73) Assignee: Panasonic Corporation, Osaka (JP)

( * ) Notice: Subject to any disclaimer, the term of this patent is extended or adjusted under 35 U.S.C. 154(b) by 1188 days.

(21) Appl. No.: 11/457,209

(22) Filed: Jul. 13, 2006

(65) Prior Publication Data
US 2007/0014206 A1 Jan. 18, 2007

(30) Foreign Application Priority Data

Jul. 14, 2005 (JP) ................... 2005-205259

(51) Int. Cl.
*G11B 7/12* (2006.01)
*G11B 7/135* (2006.01)
(52) U.S. Cl. .............. 369/44.23; 369/53.25; 369/112.36
(58) Field of Classification Search ............... 369/44.23, 369/112.26, 112.23, 44.21, 44.27, 53.25; 720/669
See application file for complete search history.

(56) References Cited

U.S. PATENT DOCUMENTS

| 5,864,524 | A * | 1/1999 | Sakaguchi ................. 369/44.21 |
| 5,986,984 | A * | 11/1999 | Nakamura et al. .......... 369/44.23 |
| 6,895,593 | B2 * | 5/2005 | Kim et al. ..................... 720/669 |
| 2003/0103441 | A1 | 6/2003 | Kim et al. |
| 2004/0052509 | A1 | 3/2004 | Shimada et al. |

FOREIGN PATENT DOCUMENTS

| JP | 09-115170 | 5/1997 |
| JP | 2001-067700 | 3/2001 |
| JP | 2001-319358 | 11/2001 |
| JP | 2004-103189 | 4/2002 |
| JP | 2002-342977 | 11/2002 |
| JP | 2003-272197 | 9/2003 |
| JP | 2003-281758 | 10/2003 |

* cited by examiner

*Primary Examiner* — Hoa T Nguyen
*Assistant Examiner* — Kim-Kwok Chu
(74) *Attorney, Agent, or Firm* — Renner, Otto, Boisselle & Sklar, LLP

(57) ABSTRACT

A highly reliable optical pickup which is not likely to collide with an optical disk is provided. Relative positions of two objective lenses 100 and 101 (along a focus direction) on a lens holder 102 are determined so that, while the objective lens 101 having a longer working distance is focused on an optical disk 200, the objective lens 100 having a shorter working distance and a protective member 103 are at positions which are more distant from the optical disk 200 than a height h of a protrusion which is present in an inner peripheral region of the optical disk optical disk 200.

4 Claims, 5 Drawing Sheets

OPTICAL PICKUP DEVICE AND INFORMATION PROCESSING APPARATUS INCORPORATING THE OPTICAL PICKUP

BACKGROUND OF THE INVENTION

1. Field of the Invention

The present invention relates to: an optical pickup device for performing recording/reproduction for a plurality of types of optical disks, such as digital versatile discs (hereinafter referred to as "DVDs") and Blu-ray discs (hereinafter referred to as "BDs"); and an information processing apparatus incorporating the optical pickup device.

2. Description of the Related Art

A DVD is known as an optical disk that allows for recording with a recording density which is about six times the recording density of a CD, such that large-capacity digital data (e.g., movies or music) can be written thereto. In the recent years, the increasing amounts of information to be recorded have called for optical disks with greater capacities.

In order to increase the capacity of an optical disk, it is necessary to increase the recording density of information. This is generally realized by reducing the spot diameter of laser light which is radiated onto the optical disk during a data write or read. In order to reduce the spot diameter of light, the wavelength of the laser light may be reduced and the numerical aperture (NA) of an objective lens may be increased. In the case of a CD, infrared laser light having a wavelength of 780 nm and a converging element (so-called objective lens) having an NA of 0.45 are used. In the case of a DVD, red laser light having a wavelength of 660 nm and a converging element having an NA of 0.6 are used.

There has also been developed the BD, which, by using blue laser light having a wavelength of 405 nm and an objective lens having an NA of 0.85, allows information to be recorded with a recording density which is five times that of the DVD.

There are several possible structures to be adopted in an information processing apparatus (hereinafter also referred to as an "optical disk apparatus") which realizes recording/reproduction for both types of optical disks, i.e., BDs and DVDs. One structure involves use of two optical pickup devices, i.e., one dedicated to BDs and another dedicated to DVDs. In this case, the use of separate optical pickup devices results in an increased size of the optical disk apparatus, although designing of each individual optical pickup device may be easy. Another structure employs a single optical pickup device to support all types of optical disks, whereby the optical disk apparatus can be kept the same size as conventionally. As the means for converging laser light in this case, a single objective lens actuator may be used to drive two lenses, i.e., an objective lens for BDs and an objective lens for DVDs, which are switched in accordance with the type of optical disk.

The distance from a point on the surface of an objective lens that lies closest to an optical disk for which recording/reproduction is to be performed (hereinafter referred to as the "proximal point") to the optical disk surface is known as a working distance (WD). Generally speaking, an objective lens for BDs has a much shorter working distance than that of an objective lens for DVDs. For example, consider a structure in which the proximal point of an objective lens for BDs and the proximal point of an objective lens for DVDs are placed at the same height (along the focus direction) from the surface of an optical disk to be subjected to recording/reproduction, in a state where the actuator is not powered (hereinafter referred to as an "initial position"). With this structure, focus servo can be achieved when performing recording/reproduction for a DVD. However, when performing recording/reproduction for a BD, it is necessary to first bring the objective lens for BDs closer to the optical disk (e.g. by applying a DC current to the actuator), thus moving the objective lens for BDs to a position equal to the WD for BDs, before trying to establish focus servo. FIG. 5 shows a lens holder 302 of this structure. In this lens holder 302, a objective lens 301 for DVDs having a working distance of W1 and an objective lens 300 for BDs having a working distance of WD2 are disposed side by side on the same plane. As shown in (a) of FIG. 5, the lens holder 302 is at its initial position during recording/reproduction for a DVD 200a. However, as shown in (b) of FIG. 5, the lens holder 302 is brought closer to a BD 200b during recording/reproduction for the BD 200b. Specifically, during recording/reproduction for the BD 200b, the lens holder 302 is moved closer toward the optical disk (BD 200b), by a difference (W1−W2) between the respective working distances, from its initial position. Thus, in order to perform recording/reproduction with the lens holder 302 being shifted from the initial position, it is necessary to keep applying a DC current to the actuator within the optical pickup device. This not only requires the actuator to be capable of moving over an enlarged range, but also increases the power consumption of the actuator, corresponding to the offset.

Such an offset can be avoided by disposing the two objective lenses 300 and 301 on the lens holder 302 in such a manner that, by a distance x which is equal to the difference (W1−W2) between the respective working distances, the objective lens 300 for BDs is located closer to the optical disk than is the objective lens 301 for DVDs. FIG. 6 shows a lens holder 402 of this structure. With this structure, in an initial position, the two objective lenses 300 and 301 are at their respective working distances W1 and W2 from the respective optical disks (DVD 200a, BD 200b). Therefore, during recording/reproduction for the BD 200b, it is unnecessary to keep the actuator being offset in a direction toward the BD 200b, whereby increase in the power consumption of the actuator can be avoided.

FIG. 7 is a diagram which more precisely shows relative positions of the objective lenses 300 and 301. In FIG. 7, the difference between the proximal point of the objective lens 300 with respect to the optical disk 200 and the proximal point of the objective lens 301 with respect to the optical disk 200 is defined by a distance "x".

In the lens holder 402 of FIG. 6, x=W1−W2 is true, so that increase in power consumption due to offset can be avoided. However, as shown in (a) of FIG. 6, the objective lens 300 for BDs is brought closer to the DVD 200a during recording/reproduction for the DVD 200a, thus resulting in an increased likelihood that the objective lens 300 may collide with the DVD when focus servo fails, for example. Moreover, during actual recording/reproduction for the DVD 200a, there may exist "surface runout", i.e., periodic wobbling (with rotations of the DVD 200a) of the surface of the DVD 200a facing the lens. Therefore, if focus servo should fail during rotation of the DVD 200a, there is a very high likelihood that the DVD 200a may collide with the objective lens 300, given that the amount of surface runout is large. The objective lens 300 for BDs has a short working distance W2. If the value of this short working distance W2 is smaller than the maximum value of the amount of surface runout of the optical disk 200, the aforementioned colliding problem will be prominent.

In order to solve the above problem, Japanese Laid-Open Patent Publication No. 2004-103189 discloses determining the distance x by taking into consideration the maximum amount of surface runout of an optical disk. FIG. 8 shows a lens holder 502 in which the distance x is prescribed so that x<(W1−maximum amount of surface runout). By using the lens holder 502 of this structure, it is possible to prevent collision between the objective lens 300 and the DVD 200a upon failure of focus servo, because the distance between the objective lens 300 and the DVD 200a is greater than the maximum amount of surface runout of the DVD 200a.

Similarly, Japanese Laid-Open Patent Publication No. 2003-281758 discloses a technique which, in a pickup device having two objective lenses, determines the relative positions of the objective lenses along the focus direction so as to avoid collision between an optical disk and the objective lens having a shorter working distance.

However, the inventors have conducted a detailed study of collisions between the objective lens 100 for BDs and the optical disk 200 by actually operating an optical disk apparatus, which indicated that there are cases where collision cannot be prevented by merely determining the distance x by taking into consideration the surface runout of the optical disk.

In order to prevent collision between the objective lens and the optical disk, it might be possible to provide a protective member around the objective lens, such that the protective member is more protruding toward the optical disk than is a proximal point of the objective lens facing toward the optical disk. However, when performing recording/reproduction at an inner peripheral portion of the optical disk by using the objective lens having a longer working distance, the objective lens having a shorter working distance and the protective member may come in contact with a protrusion (stack rib) which is formed at the inner peripheral portion of the optical disk, thus causing malfunctioning such as servo failure.

SUMMARY OF THE INVENTION

The present invention has been made in order to solve the aforementioned problems, and an objective thereof is to ensure that, in an optical pickup device having a single actuator which includes two objective lenses of different working distances, the objective lens having a shorter working distance is prevented from coming in contact with a protrusion at the inner periphery of an optical disk, when performing recording/reproduction for the optical disk by using the objective lens having a longer working distance.

Another objective of the present invention is to ensure that an objective lens is prevented from colliding directly with an optical disk even when focus servo fails due to a strong impact during recording/reproduction, or when vibration occurs while focus servo is not active.

An optical pickup device according to the present invention is an optical pickup device capable of optically accessing an optical disk, the optical disk being any one of a plurality of different types of optical disks including a first optical disk and a second optical disk, the optical pickup device comprising: a first objective lens to be used in performing reproduction or recording for the first optical disk and having a working distance of W1 with respect to the first optical disk; a second objective lens to be used in performing reproduction or recording for the second optical disk and having a working distance of W2 with respect to the second optical disk, where the relationship W1>W2 is satisfied; a lens holder for holding the first and second objective lenses so that a second proximal point of the second objective lens with respect to the optical disk is closer to the optical disk, by a distance x, than is a first proximal point of the first objective lens with respect to the optical disk; and a protective member which is more protruding toward the optical disk, by a distance d, than is the second proximal point of the second objective lens, wherein, the relationship $0<x\leq W1-(d+h)$ is satisfied, where h is a height of a protrusion formed in an inner peripheral region of a light incident surface of the first optical disk.

In a preferred embodiment, the relationship $\{W1-(d+h)\}\times 0.5<x$ is satisfied.

In a preferred embodiment, the protective member is provided on a side of the second objective lens.

In a preferred embodiment, a plane containing an optical axis of the first objective lens and an optical axis of the second objective lens lies substantially perpendicular to a line interconnecting a center of the optical pickup and a center of the optical disk.

An information processing apparatus according to the present invention is an information processing apparatus comprising: any of the above optical pickup devices; a motor for rotating the optical disk; and a signal processing device for generating a reproduction signal and a servo signal based on reflected light from the optical disk.

Alternatively, an optical pickup device according to the present invention is an optical pickup device capable of optically accessing an optical disk, the optical disk being any one of a plurality of different types of optical disks including a first optical disk, a second optical disk, and a third optical disk, the optical pickup device comprising: a first light source for irradiating the first optical disk with light having a wavelength λ1; a second light source for irradiating the second optical disk with light having a wavelength λ2 (where λ1>λ2); a third light source for irradiating the third optical disk with light having a wavelength λ3 (where λ1<λ3); a first objective lens for converging light which is radiated from the first light source and the third light source onto the first optical disk and the third optical disk, respectively, the first objective lens having a working distance of W1 with respect to the first optical disk and a working distance of W3 with respect to the third optical disk; a second objective lens for converging light radiated from the second light source onto the second optical disk, the second objective lens having a working distance of W2 with respect to the second optical disk, where the relationships W1>W2 and W3>W2 are both satisfied; a lens holder for holding the first and second objective lenses so that a second proximal point of the second objective lens with respect to the optical disk is closer to the optical disk, by a distance x, than is a first proximal point of the first objective lens with respect to the optical disk; and a protective member which is more protruding toward the optical disk, by a distance d, than is the second proximal point of the second objective lens, wherein, the relationship $0<x\leq W3-d+h)$ is satisfied, where h is a height of a protrusion formed in an inner peripheral region of a light incident surface of the third optical disk.

In a preferred embodiment, the relationship $\{W3-(d+h)\}\times 0.5<x$ is satisfied.

Alternatively, an optical pickup device according to the present invention is an optical pickup device capable of optically accessing an optical disk, the optical disk being any one of a plurality of different types of optical disks including a DVD, BD, and a CD, the optical pickup device comprising: a first objective lens to be used in performing reproduction or recording for the DVD and the CD, and having a working distance of W1 with respect to the DVD and a working distance of W3 with respect to the CD; a second objective lens to be used in performing reproduction or recording for the BD and having a working distance of W2 with respect to the BD; a lens holder for holding the first and second objective lenses so that a second proximal point of the second objective lens with respect to the optical disk is closer to the optical disk, by a distance x, than is a first proximal point of the first objective lens with respect to the optical disk; and a protective member which is more protruding toward the optical disk, by a distance d, than is the second proximal point of the second objective lens, wherein, the relationship $0 < x \leq W3-(d+h)$ is satisfied, where h is a height of a protrusion formed in an inner peripheral region of a light incident surface of the CD.

In a preferred embodiment, the relationship $\{W3-(d+h)\} \times 0.5 < x$ is satisfied.

With an optical pickup device according to the present invention, while a light beam which is converged by a first objective lens having a relatively long working distance is focused on an information recording layer of a corresponding optical disk, a second objective lens having a relatively short working distance and a protective member are at positions which are more distant from the optical disk than the height of a stack rib which is provided at the inner periphery of the optical disk. Therefore, even while performing recording/reproduction for an innermost peripheral portion of the optical disk, the second objective lens having a shorter working distance and the protective member will not come in contact with the stack rib to cause malfunctioning such as servo failure.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, an embodiment of an optical pickup device according to the present invention will be described with reference to the drawings.

Figure 1:
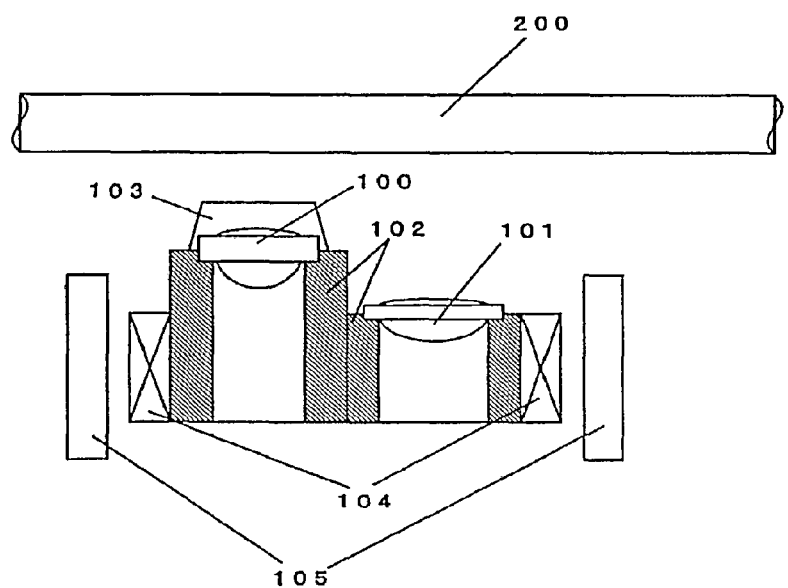
FIG. 1 is a cross-sectional view showing an embodiment of an optical pickup device according to the present invention.

First, FIG. 1 is referred to FIG. 1 shows a main portion of an optical pickup device according to the present embodiment.

As shown in FIG. 1, an objective lens 100 and an objective lens 101 are held on a lens holder 102, so as to be in predetermined positions relative to each other. On a surface of the lens holder 102 facing an optical disk 200, a protective member 103 is provided so as to surround the objective lens 100. Coils 104 are attached to the lens holder 102, and magnets 105 are provided in positions respectively opposing the coils 104. Each coil 104 and its corresponding magnet 105 together define a magnetic circuit, which allows the position of the lens holder 102 to be controlled by adjusting the amount of current flowing through the coil 104.

The objective lenses 100 and 101 converge light beams of different wavelengths onto the recording surfaces of optical disks 200 having different recording densities. Light beams having different wavelengths are radiated from different light sources (not shown), and guided to the corresponding objective lenses 100 and 101. The objective lens 100 has a shorter working distance than that of the objective lens 101, and converges a light beam of a shorter wavelength onto an optical disk 200 having a higher density.

The optical disk 200 to be supported by the optical pickup device according to the present embodiment may be one of different types of optical disks which conform to different standards. The present embodiment illustrates an exemplary optical pickup which supports BDs, DVDs, and CDs.

The objective lens 100 converges blue laser light having a wavelength of 405 nm ($\lambda2$) onto the recording surface of a BD, with an NA of 0.85. On the other hand, the objective lens 101 converges, with an NA of 0.6, red laser light having a wavelength of 660 nm ($\lambda1$) onto the recording surface of a DVD. Furthermore, the objective lens 101 converges, with an NA of 0.45, infrared laser light having a wavelength of 780 nm ($\lambda3$) onto the recording surface of a CD. In the present embodiment, the objective lens 101 having a relatively long working distance corresponds to a "first objective lens", whereas the objective lens 100 having a relatively short working distance corresponds to a "second objective lens".

Thus, by using one objective lens 101, data can be reproduced not only from a DVD but also from a CD in the present embodiment. The switching of NA of the objective lens 101 can be achieved by providing the objective lens 101 with an aperture unit which has a wavelength selectivity, such that red laser light is allowed to be transmitted therethrough but infrared laser light is blocked thereby. Specifically, an aperture restricting element which blocks infrared laser light while allowing red laser light to be transmitted therethrough may be provided on the light incident surface of the objective lens 101. As a result, although the same objective lens 101 is being used, the region through which infrared laser light is transmitted is selectively narrowed, thus resulting in a substantially reduced aperture ratio of 0.45.

The protective member 103 is a piece of cushioning material which is more protruding toward the optical disk 200 than is a proximal point of the objective lens 100. Thus, even when focus servo fails due to a strong impact applied during recording/reproduction and/or when vibration is applied while focus servo is OFF, only the protective member 103 will come in contact with the optical disk, thus preventing the proximal point of the objective lens 100 from colliding directly with the optical disk. As a result, the objective lens 100 and the optical disk 200 are prevented from being damaged.

The protective member 103 is provided around (i.e., on the sides of) only the objective lens 100. This is because the objective lens 101 is always positioned farther away from the surface of the optical disk 200 than is the objective lens 100, and therefore the objective lens 101 is not likely to collide with the optical disk 200. Thus, there is no need to provide the protective member 103 around the objective lens 101. This structure in which the protective member 103 is provided only around the objective lens 100 reduces the cost associated with forming the protective member 103 in any unnecessary place.

Note that, through interaction with the magnets 105 when a current is flowed through the coils 104, the lens holder 102 is driven in a direction perpendicular to the recording surface of the optical disk 200 (focus direction) as well as in a radial direction of the optical disk 200 (tracking direction).

Figure 2:
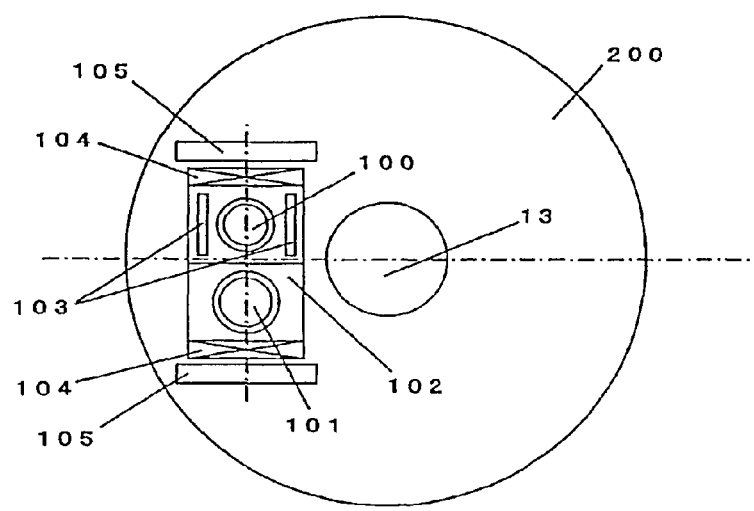
FIG. 2 is a plan view showing relative positions of an objective lens and an optical disk in the embodiment.

FIG. 2 is a plan view showing positioning of the objective lenses 100 and 101 along a direction extending in parallel to the optical disk 200. A turntable 13 engages with a center hole in the optical disk 200 so as to keep the optical disk 200 in place. The objective lenses 100 and 101 are disposed side by side along a direction orthogonal to the radial direction of the optical disk 200. More strictly speaking, in the present embodiment, a plane containing the optical axis of the objective lens 100 and the optical axis of the objective lens 101 lies substantially perpendicularly to a line interconnecting the center of the optical pickup and the center of the optical disk 200. Suppose, instead, that the two objective lenses 100 and 101 were rotated by 90° from the arrangement shown in FIG. 2; in this case, in order to perform recording/reproduction for an innermost peripheral portion of the optical disk 200 with one of the objective lenses that is disposed at the outer peripheral side of the optical disk 200, it would be necessary to somehow prevent interference between the turntable 13 and the other objective lens that is disposed at the inner peripheral side, which would present a considerable design constraint. That is, use of a smaller disk motor would be necessitated to avoid such interference.

In contrast, the present embodiment employs two objective lenses 100 and 101 which are disposed side by side along a direction orthogonal to a traverse direction of the optical pickup. As a result, the two objective lenses 100 and 101 are always at a substantially equal radial position with respect to the center of the optical disk 200. This eliminates the need to pay attention to the aforementioned interference with the turntable 13, whereby an increased design freedom is obtained.

Figure 3:
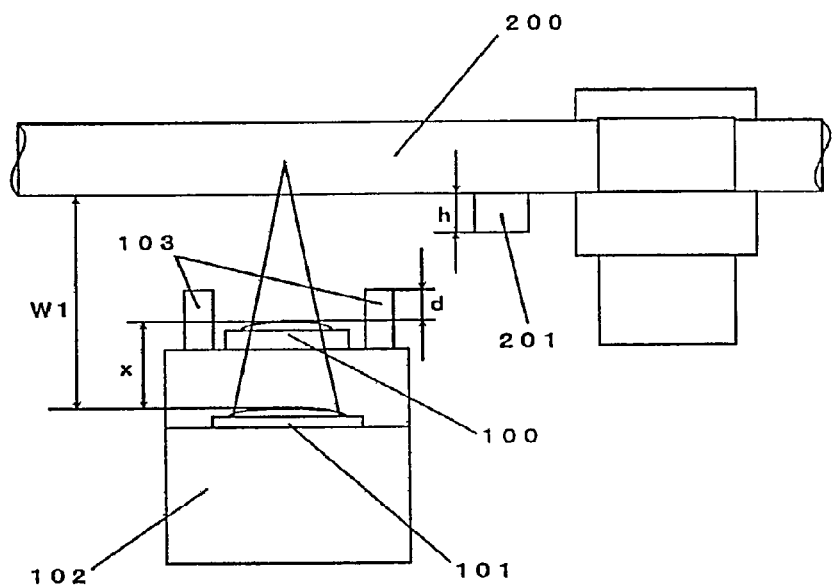
FIG. 3 is a side view showing relative positions of an objective lens and an optical disk in the embodiment.

FIG. 3 shows a state where a light beam which is converged via the objective lens 101 is focused on an information layer of the optical disk 200. In the present specification, the following parameters as shown in FIG. 3 are assumed: the WD of the objective lens 101 is W1; a difference between the proximal point ("first proximal point") of the objective lens 101 with respect to the optical disk 200 and the proximal point ("second proximal point") of the objective lens 100 with respect to the optical disk 200 is x; a difference between the ("second") proximal point of the objective lens 100 and an upper face of the protective member 103 (i.e., the surface facing the optical disk 200) is d; and a stack rib 201 which is provided at the inner periphery of the optical disk 200 has a height h. Note that the proximal point of each of the objective lenses 100 and 101 in the present embodiment is defined as a point at which the optical axis of the objective lens intersects the surface of the objective lens facing the optical disk.

In the present embodiment, the relative positions of the objective lenses 100 and 101 (along the focus direction) on the lens holder 102 are prescribed so as to satisfy the following relationship:

$$0 < x \leq W1 - (d+h).$$

Since the above condition is satisfied, while the objective lens 101 is focused on the information layer of the optical disk 200 (DVD or CD), the objective lens 100 and the protective member 103 are at positions which are more distant from the optical disk 200 than the height of the stack rib 201 which is provided at the inner periphery of the optical disk. As a result, even when performing information recording/reproduction for an innermost peripheral portion of the optical disk 200 that is a DVD or a CD, the objective lens 100 and the protective member 103 are prevented from coming in contact with the stack rib 201 to cause malfunctioning such as servo failure.

Figure 5:
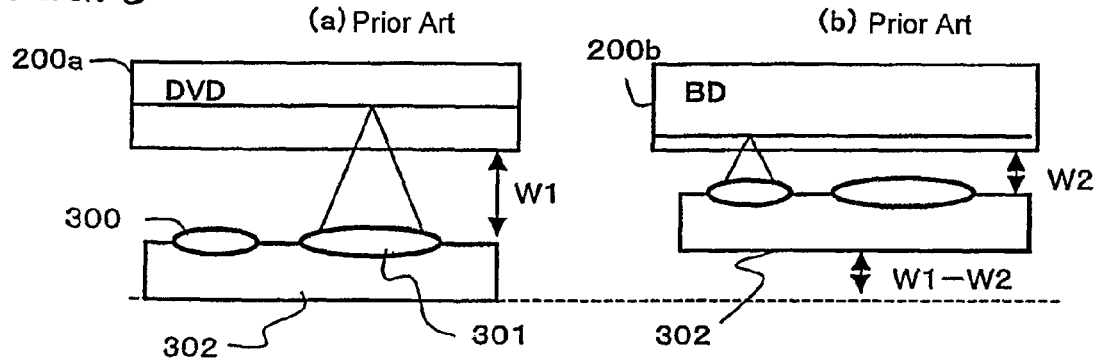
FIG. 5 includes cross-sectional views (a) and (b) showing a conventional lens arrangement in which the positions of two objective lenses are not shifted along the focus direction.
Figure 6:
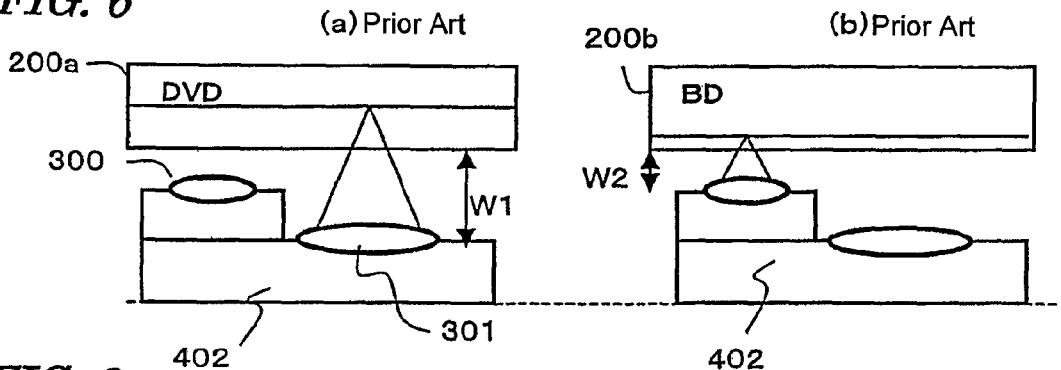
FIG. 6 includes cross-sectional views (a) and (b) showing a conventional lens arrangement in which the positions of two objective lenses are shifted along the focus direction.
Figure 8:
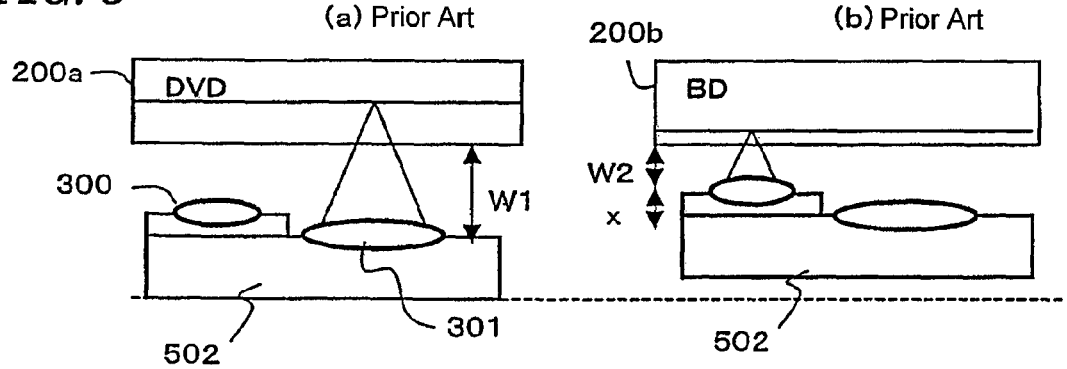
FIG. 8 includes cross-sectional views (a) and (b) showing a conventional optical pickup device which is an improvement from the device of FIG. 6 by taking surface runout into consideration.
Figure 10:
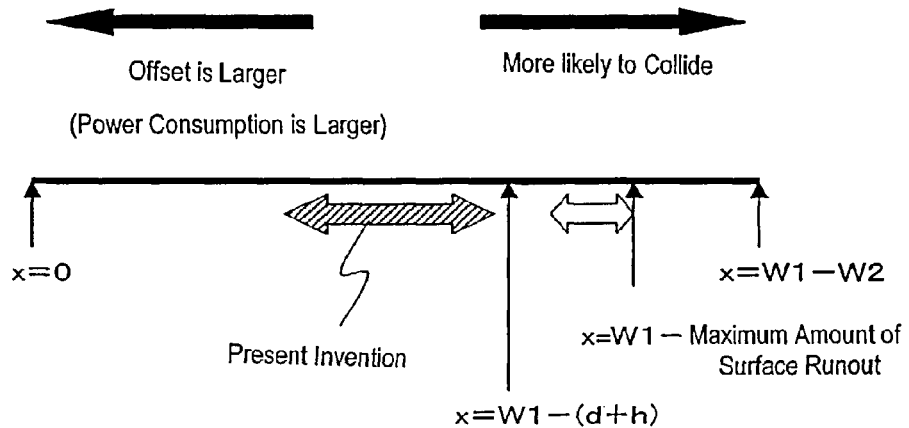
FIG. 10 is a diagram showing a relationship between a preferable range of distance x according to an embodiment of the present invention and a conventional distance x.

FIG. 10 is a diagram showing a relationship between a preferable range of distance x according to the present embodiment and a conventional distance x. When x=0 (as shown in FIG. 5), there is a large offset, thus resulting in a very high current consumption. Conversely, when x=W1−W2 (as shown in FIG. 6), there is a danger of colliding with a DVD, although the offset amount is zero. This has led to the conventional practice of prescribing the x value as large as possible while avoiding collision with an optical disk. Therefore, in the conventional technique which taking into consideration the surface runout of the optical disk, x is prescribed to a value which is less than (W1−maximum amount of surface runout) but is as close to (W1−maximum amount of surface runout) as possible.

On the other hand, in the present embodiment, the distance x is prescribed to be in a range which is even smaller than (W1−maximum amount of surface runout). Specifically, conventional practice has been to prescribe (W1−maximum amount of surface runout) to be about 0.9 mm (=1.2−0.3) mm, and then prescribe the distance x to be 0.85 to 0.9 mm, for example. On the other hand, the present embodiment prescribes W1−(d+h)=0.85 mm, and then prescribes the distance x to be in the range from 0.10 to 0.85 mm, and preferably 0.75 mm. Note, however, that these values are intended for circumventing collision with a DVD, and assumes that: W1=1.2 mm; d=0.25; and h=0.1. The thick hatched arrowheads in FIG. 10 indicate the preferable range of distance x.

Figure 9:
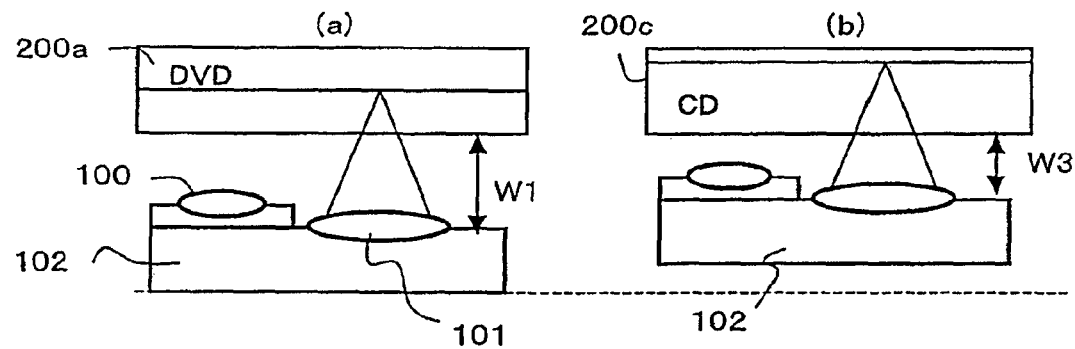
FIG. 9 includes cross-sectional views (a) and (b) showing working distances for a DVD and a CD.
Figure 7:
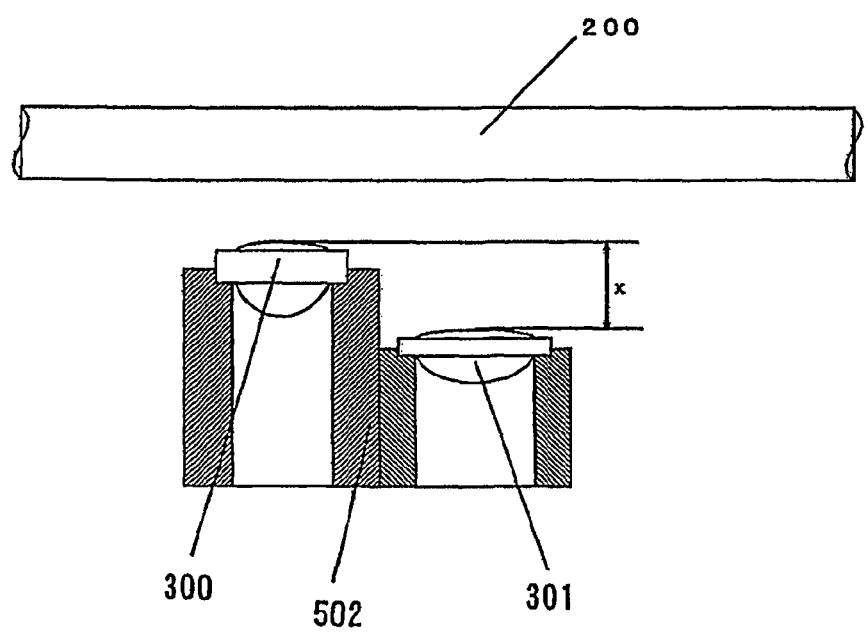
FIG. 7 is a diagram specifically showing a conventional lens arrangement in which the positions of two objective lenses are shifted along the focus direction.

In the case where the objective lens 101 having a relatively long working distance is intended to support a plurality of optical disks having different recording densities, the working distance of the objective lens 101 varies depending on the type of the optical disk for which recording/reproduction is to be performed. In FIG. 9, (a) indicates a working distance of W1 for a DVD 200a, whereas (b) indicates a working distance of W3 for a CD 200c. In the objective lens 101 used in the present embodiment, it is assumed that W1>W3.

The height h of the stack rib shown in FIG. 3 also varies depending on each optical disk standard. Under the DVD standard, which adopts red laser light, the stack rib has a maximum height of 0.25 mm; an outermost peripheral position of the stack rib is 22 mm; and an innermost peripheral position of the data area is 22 mm. On the other hand, under the CD standard, the stack rib has a maximum height of 0.4 mm; an outermost peripheral position of the stack rib is 22 mm; and an innermost peripheral position of the data area is 22.5 mm. These parameters must be reconciled.

As seen from the above facts, the objective lens 100 and the protective member 103 come close to the optical disk and are likely to collide with the stack rib on the optical disk more so during CD recording/reproduction than during DVD recording/reproduction. Therefore, in embodiments where the objective lens 101 is intended to support both DVDs and CDs, it is preferable to prescribe the x value so as to satisfy the relationship $0 < x \leq W3 - (d+h)$. In other words, W3−(d+h)=0.3 mm is first prescribed, and then the x value is prescribed to be in the range from 0.15 to 0.28 mm, and preferably 0.2 mm.

Figure 11:
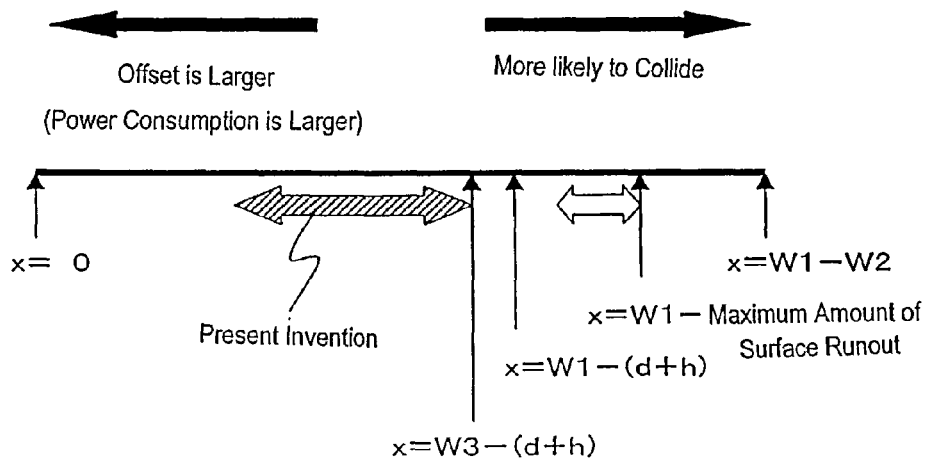
FIG. 11 is a diagram showing a relationship between an even more preferable range of distance x according to an embodiment of the present invention and a conventional distance x.

Note that these values are intended for circumventing collision with a CD, and is smaller than the aforementioned value which is only intended for circumventing collision with a DVD. Specifically, this value assumes that: W3=0.8 mm; d=0.4; and h=0.1. FIG. 11 is a diagram schematically showing an x value range when taking into consideration the working distance W3 and the maximum height h of a stack rib of a CD. The thick hatched arrowheads in FIG. 11 indicate the preferable range of distance x.

In the optical pickup device of the present embodiment, the objective lenses 100 and 101 are illustrated as being disposed side by side along a direction orthogonal to the radial direction (traverse direction) of the optical disk 200. However, the present invention is not limited thereto. For example, even in the case where the objective lenses 100 and 101 are disposed side by side along the radial direction (traverse direction), and in the case where the objective lens 100 is located at the inner peripheral side and the objective lens 101 is located at the outer peripheral side, it is still necessary to take measures against collision between the objective lens 100 and/or the protective member 103 and the stack rib.

Although the present embodiment illustrates a case where the optical pickup device has two objective lenses, the present invention is not limited thereto. In the case where there are more than two objective lenses, the protective member is to be provided around the objective lens having the shortest working distance, and the relative positions of the objective lenses must satisfy the relationship $0 < x \leq$ (second shortest working distance among all the objective lenses)$-(d+h)$.

Figure 4:
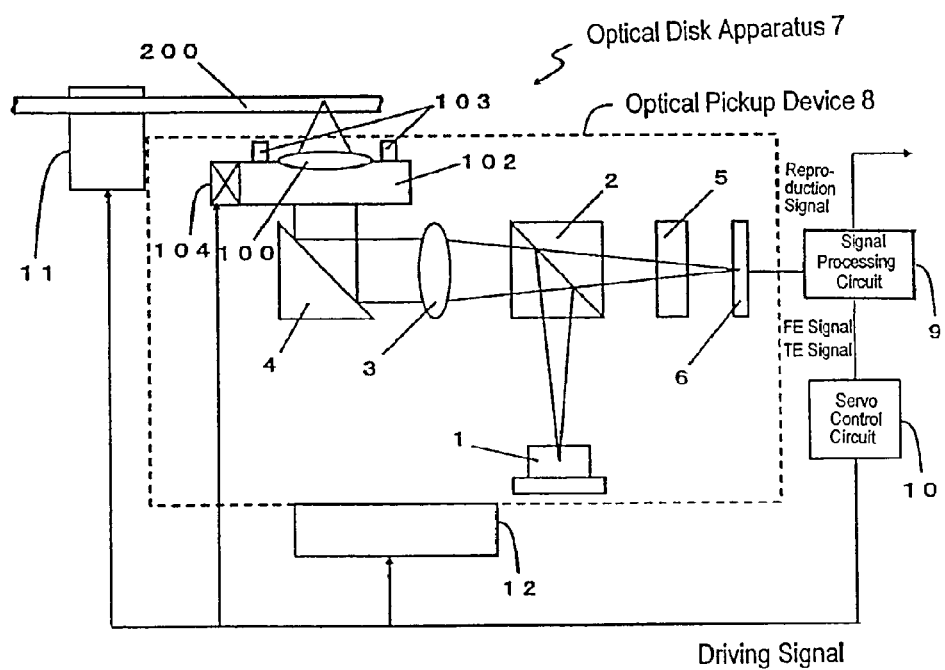
FIG. 4 is a diagram showing the structure of an optical disk apparatus according to an embodiment of the present invention.

Hereinafter, with reference to FIG. 4, the structure and operation of an optical disk apparatus 7 according to the present embodiment will be described.

The optical disk apparatus 7 according to the present embodiment includes an optical pickup device 8, a signal processing circuit 9, a servo control circuit 10, a spindle motor 11, and a traverse motor 12. Although FIG. 4 also shows an optical disk 200, this is for convenience of description; it is to be understood that the optical disk 200 is not a constituent element of the optical disk apparatus 7.

In the optical pickup device 8, a light beam is radiated toward the optical disk 200 from a light source 1; the light beam is converged by an objective lens 100 (or 101) onto an information layer of the optical disk 200; reflected light from the information layer of the optical disk 200 is detected by a photodetector 6; and a light amount signal which is in accordance with the detected position and detected light amount of the reflected light is output to the signal processing circuit 9. In accordance with the light amount signal which is output from the photodetector 6, the signal processing circuit 9 generates signals such as a focus error (FE) signal, which indicates the focusing state of the light beam on the optical disk 200, and a tracking error (TE) signal, which indicates the relative positioning between the focus position of the light beam and a track on the optical disk 200, and outputs these signals to the servo circuit 10. The FE signal and the TE signal may collectively be referred to as servo signals. Based on these signals, the servo control circuit 10 generates driving signals, which are output to the traverse motor 12, an actuator coil 104, and the spindle motor 11. Based on the driving signal which is input to the actuator coil 104 of the optical pickup device 8 (described below), the position of the objective lens 100 is adjusted. As a result, the light beam radiated onto the optical disk 200 is controlled so that its focal point will not deviate from the information on the optical disk 200. The spindle motor 11 rotates the optical disk 200 at a rotation speed which is in accordance with the recording/reproduction speed. The traverse motor 12 causes the optical pickup device 8 to move to a target recording/reproduction position along the radial direction of the optical disk 200.

While the focal point of the light beam is being controlled so as not to deviate from the recording layer, the signal processing circuit 9 outputs a reproduction signal based on the light amount signal from the photodetector 6. The reproduction signal represents data which has been written to the optical disk 200. Thus, a data read from the optical disk 200 is carried out. By increasing the optical power of the light beam above the level which is used for reproduction, data can be written to the optical disk 200.

Now, the structure of the optical pickup device 8 will be described more specifically. The optical pickup device 8 includes the light source 1, a beam splitter 2, a collimating lens 3, a mirror 4, the objective lens 100, a lens holder 102, a protective member 103, the actuator coil 104, a multilens 5, and the photodetector 6. Although only one light source and one objective lens (denoted as 100) are illustrated for simplicity, it will be appreciated that the optical pickup device of the present embodiment actually includes two light sources and two objective lenses.

The light source 1 is a semiconductor laser which radiates coherent light for a data read/write toward the recording layer of the optical disk 200. The beam splitter 2 splits the light beam which is radiated from the light source 1. The collimating lens 3 collimates the light beam radiated from the light source 1 into parallel light. The mirror 4 reflects the incident light beam, so that the reflected light beam is directed toward the optical disk 200. The objective lens 100 converges the light beam onto the recording layer of the optical disk 200. In accordance with the level of an applied driving signal, the actuator coil 104 causes the position of the lens holder 102 (having the objective lens 100 mounted thereon) to be changed along a direction extending perpendicularly to the optical disk 200 or a direction extending in parallel to the optical disk 200. The multilens 5 converges the light beam onto the photodetector 6. The photodetector 6 receives the light beam which has been reflected from the recording layer of the optical disk 200, and converts the light beam into an electrical signal (light amount signal) in accordance with its light amount. Note that the photodetector 6 may include a plurality of photosensitive elements. The signal processing circuit 9, which receives the light amount signal, may also utilize information as to which photosensitive element the light amount signal has been output from, in generating an FE signal and a TE signal.

As described above, in accordance with preferred embodiments of the present invention, while a first objective lens having a longer working distance has its focus on an optical disk, a second objective lens having a shorter working distance and a protective member are at positions which are more distant from the optical disk than the height of a stack rib which is provided at the inner periphery of the optical disk. As a result, even when performing information recording/reproduction for an innermost peripheral portion of the optical disk, the second objective lens having a shorter WD and the protective member are prevented from coming in contact with the stack rib to cause malfunctioning such as servo failure.

Moreover, the protective member which is provided around the second objective lens having a shorter working distance ensures that, even when focus servo fails due to a strong impact applied during recording/reproduction and/or when vibration is applied while focus servo is OFF, only the protective member will come in contact with the optical disk, thus preventing the objective lens from colliding directly with the optical disk. As a result, the objective lens is prevented from being damaged. The protective member does not need to be provided around the first objective lens having a longer WD, so long as it is provided around the second objective lens having a shorter WD. Therefore, the cost for producing the protective member can be minimized.

The optical pickup device according to the present invention ensures that, when performing recording/reproduction for an optical disk by using an objective lens having a longer working distance, an objective lens having a shorter working distance and a protective member from will not come in contact with a protrusion at the inner periphery of the optical disk to cause malfunctioning such as servo failure. Therefore, the optical pickup device according to the present invention is broadly applicable to any optical disk apparatus that is capable of performing recording/reproduction for a plurality of types of optical disks.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical pickup device capable of optically accessing an optical disk, the optical disk being any one of a plurality of different types of optical disks including a first optical disk and a second optical disk, the optical pickup device comprising:
    a first objective lens for converging red laser light onto a recording surface of the first optical disk to perform reproduction or recording for the first optical disk, the first objective lens having a working distance of W1 with respect to the first optical disk;
    a second objective lens for converging blue laser light onto a recording surface of the second optical disk to perform reproduction or recording for the second optical disk, the second objective lens having a working distance of W2 with respect to the second optical disk, where the relationship W1>W2 is satisfied;
    a lens holder for holding the first and second objective lenses so that a second proximal point of the second objective lens with respect to the optical disk is closer to the optical disk, by a distance x, than is a first proximal point of the first objective lens with respect to the optical disk; and
    a protective member which is provided on the lens holder and more protruding toward the optical disk, by a distance d, than is the second proximal point of the second objective lens, wherein,
    the first objective lens, the second objective lens and the protective member are arranged on the lens holder so as to satisfy the relationship $0<x\leq\{W1-(d+h)\}$, where h is a height of a protrusion formed in an inner peripheral region of a light incident surface of the first optical disk.

2. The optical pickup device of claim 1, wherein the protective member is provided on a side of the second objective lens.

3. The optical pickup device of claim 1, wherein a plane containing an optical axis of the first objective lens and an optical axis of the second objective lens lies substantially perpendicular to a line interconnecting a center of the optical pickup and a center of the optical disk.

4. An information processing apparatus comprising:
    the optical pickup device of claim 1;
    a motor for rotating the optical disk; and
    a signal processing device for generating a reproduction signal and a servo signal based on reflected light from the optical disk.

* * * * *